United States Patent
Tornquist et al.

(10) Patent No.: US 6,747,383 B2
(45) Date of Patent: Jun. 8, 2004

(54) GENERATOR WITH HYDRAULICALLY MOUNTED STATOR ROTOR

(75) Inventors: Gerald E. Tornquist, Tucson, AZ (US); Gregor McDowall, Tucson, AZ (US)

(73) Assignee: Honeywell International, Inc., Morristown, NJ (US)

( * ) Notice: Subject to any disclaimer, the term of this patent is extended or adjusted under 35 U.S.C. 154(b) by 54 days.

(21) Appl. No.: 10/119,345

(22) Filed: Apr. 9, 2002

(65) Prior Publication Data

US 2003/0189382 A1 Oct. 9, 2003

(51) Int. Cl.[7] .............. H02K 5/16; H02K 5/00; H02K 7/08
(52) U.S. Cl. ............ 310/91; 310/90; 310/156.16
(58) Field of Search .................. 310/90, 91; 384/107

(56) References Cited

U.S. PATENT DOCUMENTS

| | | |
|---|---|---|
| 2,010,362 A | 8/1935 | Herrmann et al. |
| 2,433,516 A | 12/1947 | Liunggmen |
| 3,456,992 A | 7/1969 | Kulina |
| 3,650,582 A | 3/1972 | Casey |
| 3,757,147 A * | 9/1973 | Lyman, Jr. .............. 310/49 R |
| 4,172,985 A * | 10/1979 | Meier ..................... 310/74 |
| 4,406,963 A * | 9/1983 | Wolf et al. ............... 310/239 |
| 4,440,456 A | 4/1984 | Klusman |
| 4,480,881 A * | 11/1984 | Fujimori ................. 310/90 |
| 4,521,708 A * | 6/1985 | Vandevier ............... 310/87 |
| 4,527,912 A | 7/1985 | Klusman |
| 4,605,317 A | 8/1986 | Bonaccorso |
| 4,672,250 A * | 6/1987 | Seitz ..................... 310/90 |
| 4,760,298 A * | 7/1988 | Kitahara et al. ......... 310/67 R |
| 4,779,165 A * | 10/1988 | Elsaesser et al. ........ 360/97.02 |
| 4,805,972 A * | 2/1989 | Tanaka et al. ........... 359/200 |
| 4,858,304 A | 8/1989 | Weldon et al. |
| 4,896,239 A * | 1/1990 | Ghose .................... 360/267 |
| 4,900,958 A * | 2/1990 | Kitahara et al. ......... 310/67 R |
| 4,905,110 A * | 2/1990 | Krum et al. ............. 360/99.08 |
| 5,045,738 A * | 9/1991 | Hishida et al. .......... 310/90 |
| 5,047,677 A * | 9/1991 | Mineta et al. ........... 310/67 R |
| 5,057,731 A * | 10/1991 | Hancock ................. 310/180 |
| 5,061,868 A * | 10/1991 | Iwazaki et al. ......... 310/67 R |
| RE33,813 E * | 2/1992 | von der Heide et al. .... 310/51 |
| 5,106,208 A | 4/1992 | Bobo et al. |
| 5,145,298 A * | 9/1992 | Marantette .............. 409/135 |
| 5,160,866 A * | 11/1992 | Hishida et al. .......... 310/90 |
| 5,318,391 A | 5/1994 | Monzel |
| RE34,684 E * | 8/1994 | Kiahara et al. ......... 310/67 R |
| 5,336,955 A * | 8/1994 | Suzuki et al. ........... 310/90 |
| 5,357,272 A * | 10/1994 | Watanabe et al. ......... 347/257 |
| 5,436,519 A * | 7/1995 | Takahashi et al. ....... 310/217 |
| 5,454,724 A * | 10/1995 | Kloeppel et al. ........ 439/17 |
| 5,463,490 A * | 10/1995 | Seto ..................... 359/200 |
| 5,471,104 A * | 11/1995 | Toshimitsu et al. ...... 310/90 |

(List continued on next page.)

FOREIGN PATENT DOCUMENTS

| | | |
|---|---|---|
| EP | 1 174 529 A1 | 1/2002 |
| GB | 1 418 907 A | 12/1975 |
| GB | 2 080 888 A | 2/1982 |

OTHER PUBLICATIONS

Gunter, et al., "Design of Nonlinear Squeeze–Film Dampers for Aircraft Engines," Journal of Lubrication Tech., Jan. 1977, pp. 57–64.

*Primary Examiner*—Dang Le
*Assistant Examiner*—Heba Elkassabgi
(74) *Attorney, Agent, or Firm*—Robert Desmond, Esq.

(57) ABSTRACT

A high speed generator with a hydraulic rotor mounting system that dampens rotor vibrations at the rotor's critical speeds. Oil is supplied to a gap formed between the outer race of the rotor bearing assembly and the bearing liner. The oil provides soft bearing support for, and viscous damping of, the rotor.

27 Claims, 6 Drawing Sheets

U.S. PATENT DOCUMENTS

| | | | |
|---|---|---|---|
| 5,483,113 A | * | 1/1996 | Sakuragi et al. .......... 310/67 R |
| 5,509,643 A | | 4/1996 | Carstens et al. |
| 5,571,004 A | * | 11/1996 | Masters et al. ............. 418/107 |
| 5,598,047 A | * | 1/1997 | Sakuragi et al. .......... 310/67 R |
| 5,606,475 A | * | 2/1997 | Ishizuka .................. 360/99.08 |
| 5,659,205 A | | 8/1997 | Weisser |
| 5,747,907 A | * | 5/1998 | Miller ......................... 310/90 |
| 5,797,684 A | | 8/1998 | Becker |
| 5,880,545 A | * | 3/1999 | Takemura et al. ............ 310/90 |
| 5,921,731 A | | 7/1999 | Chandrasekar |
| 5,925,948 A | * | 7/1999 | Matsumoto ............... 310/67 R |
| 5,945,754 A | * | 8/1999 | Fulwood et al. .............. 310/74 |
| 6,040,648 A | | 3/2000 | Kawawada et al. |
| 6,176,618 B1 | | 1/2001 | Kawawada et al. |
| 6,236,535 B1 | | 5/2001 | Gilliland et al. |
| 6,264,204 B1 | | 7/2001 | Nappini et al. |
| 6,307,292 B1 | * | 10/2001 | Brown ........................ 310/90 |
| 6,342,743 B1 | * | 1/2002 | Matsuzaki et al. ............ 310/90 |
| 6,362,931 B2 | * | 3/2002 | Oelsch .................... 360/99.08 |
| 6,424,613 B1 | * | 7/2002 | Ikuta et al. ................. 369/266 |
| 6,462,441 B1 | * | 10/2002 | Horng et al. ............. 310/67 R |
| 6,563,243 B2 | * | 5/2003 | Obara et al. .................. 310/90 |
| 2002/0047387 A1 | * | 4/2002 | Obara ......................... 310/90 |
| 2002/0047394 A1 | * | 4/2002 | Obara et al. .................. 310/90 |
| 2002/0079769 A1 | * | 6/2002 | Akiwa .................... 310/156.06 |
| 2002/0135248 A1 | * | 9/2002 | Coyac et al. ................. 310/90 |
| 2003/0006659 A1 | * | 1/2003 | Yeh ............................. 310/90 |
| 2003/0155826 A1 | * | 8/2003 | Obara et al. .................. 310/90 |

\* cited by examiner

GENERATOR WITH HYDRAULICALLY MOUNTED STATOR ROTOR

FIELD OF THE INVENTION

The present invention relates to high speed generators and, more particularly, to a hydraulic mount for high speed generators used with gas turbine engines such as those used in aircraft, tanks, ships, vehicle, terrestrial, or other applications.

BACKGROUND OF THE INVENTION

Generator systems for aircraft may include three separate brushless generators, namely, a permanent magnet generator (PMG), an exciter, and a main generator. The PMG includes permanent magnets on its rotor. When the PMG rotates, AC currents are induced in stator windings of the PMG. These AC currents are fed to a regulator or a control device, which in turn outputs a DC current. This DC current next is provided to stator windings of the exciter. As the rotor of the exciter rotates, three phases of AC current are typically induced in the rotor windings. Rectifier circuits that rotate with the rotor of the exciter rectify this three-phase AC current, and the resulting DC currents are provided to the rotor windings of the main generator. Finally, as the rotor of the main generator rotates, three phases of AC current are typically induced in its stator windings, and this three-phase AC output can then be provided to a load such as, for example, an aircraft electrical system.

Because some aircraft generators are variable frequency systems that rotate in the speed range of 12,000 rpm to 24,000 rpm, potentially large centrifugal forces may be imposed upon the rotors in generators. Given these potentially stressful operating conditions, the rotors should be precisely balanced so the generator is balanced.

Even though high speed aircraft generator rotors generally are precisely designed, producing a rotor with some imbalance is generally difficult due, for example, to variations in manufacturing processes. A rotor imbalance may cause the rotor to vibrate, and deviate from its intended axis of rotation. The amplitudes of such vibration can be fairly significant if the rotor's rotational speed reaches its resonance speed, or a multiple of its resonance speed. Such speeds are generally known as "critical speeds." If an imbalanced rotor is rotating at one of the critical speeds, it may be damaged.

In view of the foregoing, one approach is to prevent operation of the generator at such critical speeds. In particular, a generator may be designed so that the critical speeds are either well above the normal operating speed range, well below the normal operating speed range, or a combination of both. In the latter two cases, where one or more of the critical speeds is below the rotor's normal operating speed range, the rotor is operated through the critical speeds on its way up to the normal operating speed range. Thus, to avoid damage, the rotor may be quickly brought through a critical speed to achieve a higher normal operating speed.

In addition to quickly bringing the rotor through critical speeds, it is also known to dampen rotor vibrations as the rotor passes through critical speeds. One known method for dampening rotor vibrations is to provide oil in the form of squeeze film between a stationary housing and the bearing liner in the rotor assembly. Such a design is undesirable under circumstances where the mount on which the rotor rotates stiffens quickly with increased loading as the rotor imbalance increases. This circumstance can cause one or more of the critical speeds to increase toward the operating speed range. In this manner, this design does not control the critical speed or speeds as may be desired.

Therefore, there is a need for a high speed generator with a rotor mounting system that successfully dampens the rotor vibration at the critical speeds, and/or that does not rapidly stiffen with increased loading, and/or that allows one or more critical speeds to be controlled. The present invention addresses one or more of these needs.

SUMMARY OF THE INVENTION

The present invention provides a system for hydraulically mounting a high speed generator rotor that dampens the rotor's vibration at its critical speeds, and/or that does not rapidly stiffen with increased loading, and/or that allows the critical speeds to be controlled.

In one embodiment of the present invention, and by way of example only, the system for hydraulically mounting a high speed generator shaft includes a bearing assembly, a cylindrical bearing liner and at least a first inlet oil port. The bearing assembly includes a bearing inner race concentrically mounted on the shaft. The bearing assembly is surrounded by the bearing liner. The bearing liner has an inner circumferential surface and an outer circumferential surface and is dimensioned such to form a gap between the bearing outer race and the bearing liner inner circumferential surface. The first inlet oil port is formed in the bearing liner and extends between the bearing liner inner circumferential surface and the bearing liner outer circumferential surface.

Other features and advantages of the preferred hydraulic mount will become apparent from the following detailed description, taken in conjunction with the accompanying drawings, which illustrate, by way of example, the principles of the invention.

DETAILED DESCRIPTION OF THE DRAWINGS

Before proceeding with the detailed description, it is to be appreciated that the present embodiment is not limited to use in conjunction with a specific type of electrical operator. Thus, although the present embodiment is, for convenience of explanation, depicted and described as being implemented in a brushless AC (alternating current) generator, it will be appreciated that it can be implemented in other AC or DC generator designs.

Figure 1:
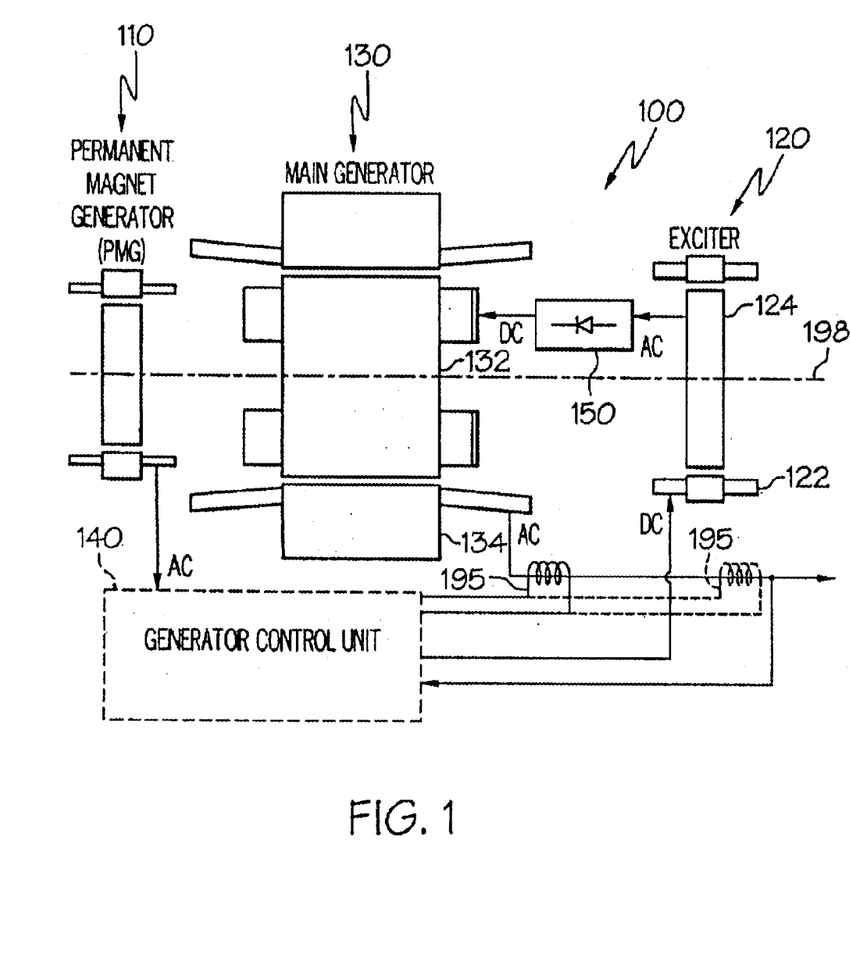
FIG. 1 is a functional schematic block diagram of an exemplary high speed generator system.

Turning now to the description, and with reference first to FIG. 1, a functional schematic block diagram of an exemplary high speed aircraft generator system 100 is depicted. This generator system 100, which is commonly known as a brushless AC generator, includes a permanent magnet generator (PMG) 110, an exciter 120, a main generator 130, a generator control unit 140, and one or more rectifier assemblies 150. During operation, the PMG 110, exciter 120, and portions of the main generator 130 all rotate. As the PMG 110 rotates, it generates and supplies AC power to a generator control unit 140, which in turn supplies direct current (DC) power to a stator 122 of the exciter 120. A rotor 124 of the exciter 120 in turn supplies AC power to the rectifier assemblies 150. The output from the rectifier assemblies 150 is DC power and is supplied to a main generator rotor shaft 132, which in turn outputs AC power from a main generator stator 134.

Figure 2:
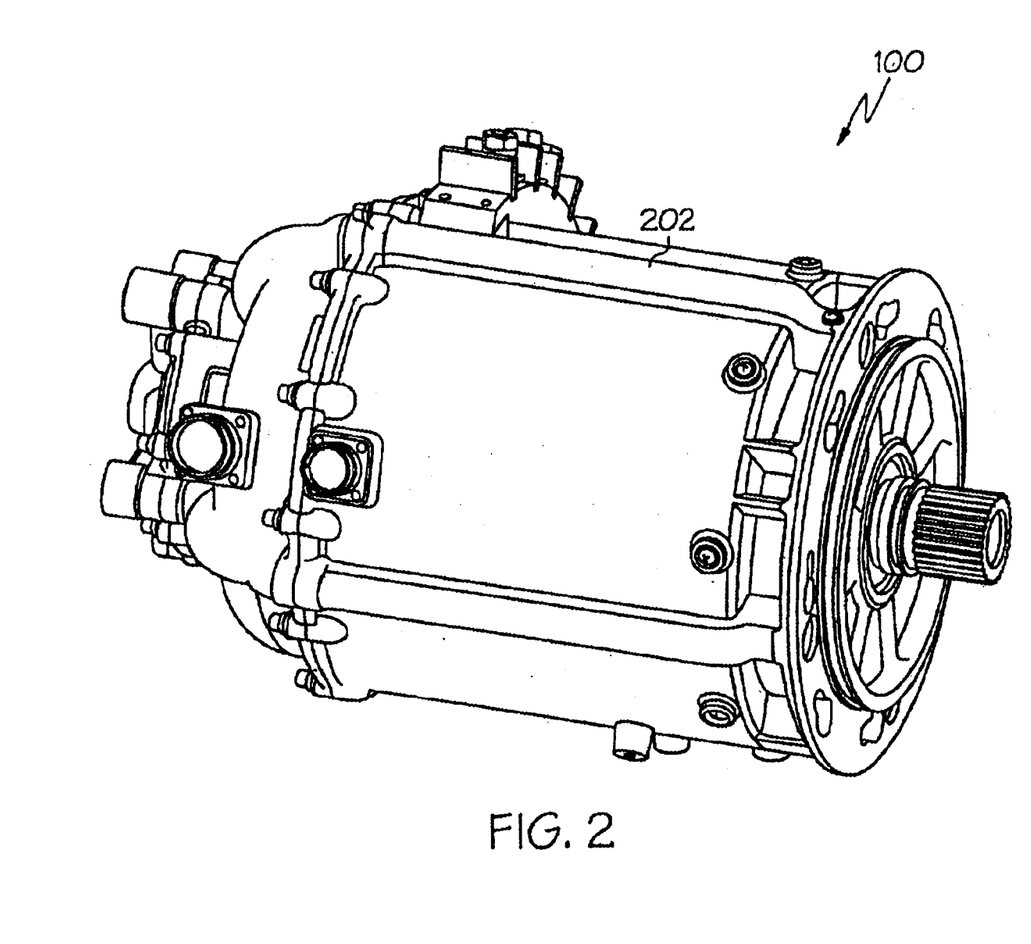
FIG. 2 is a perspective view of an embodiment of the generator system of FIG. 1.

The generator system 100 includes a variable frequency generator (VFG) capable of providing output power in a variety of frequencies (e.g., in the range of 350–750 Hz). It is to be appreciated, however, that this frequency range is for a particular application and could vary for use in other applications. The output power from the main generator stator 134 is three-phase AC power. The generator control unit 140 can regulate the power output based upon monitoring signals provided to it from monitoring devices or sensors 195. In the depicted embodiment, the PMG 110, the exciter 120, and the main generator 130 all rotate along a single axis 198 at the same rotational speed. It will be appreciated, however, that in other embodiments the PMG 110 may rotate along a different axis. Moreover, the relative positioning of the PMG 110, the exciter 120, and the main generator 130 can be modified for different applications so that the exciter 120 is physically located between the PMG 110 and the main generator 130. Other arrangements are possible. A perspective view of a physical embodiment of the generator system 100 is provided in FIG. 2. As this figure depicts, at least some of the generator system is enclosed within a housing 202.

Figure 3:
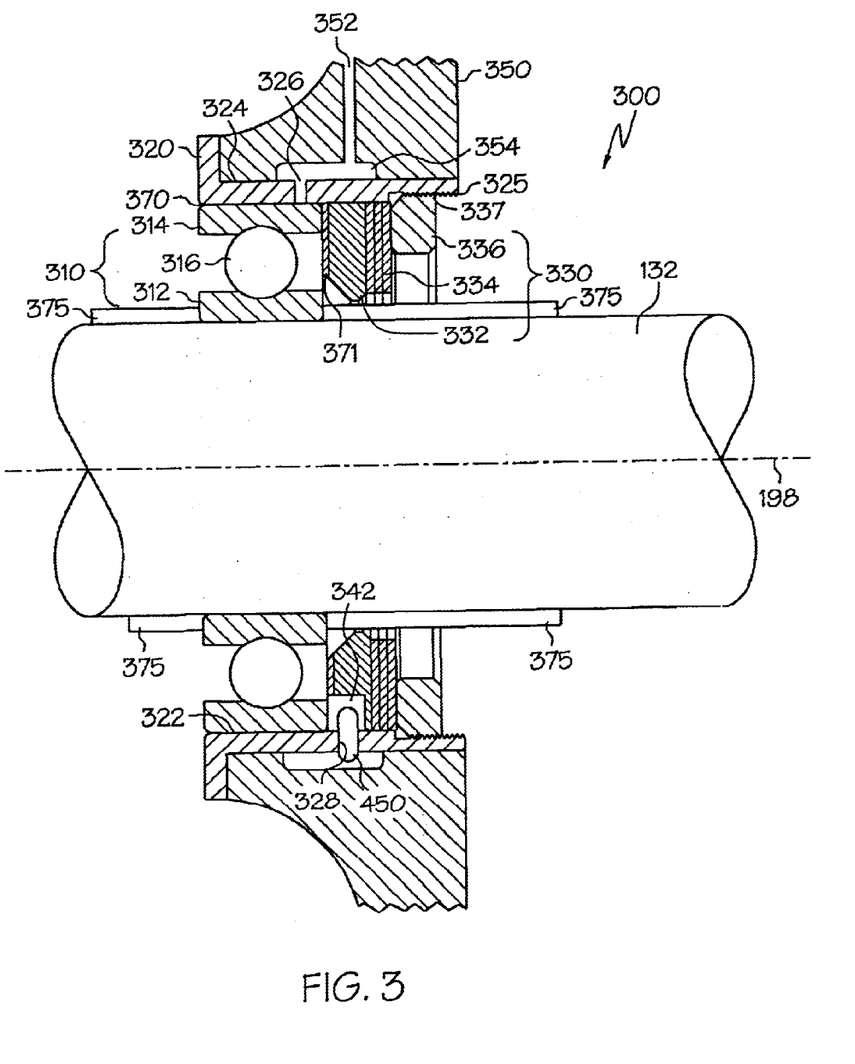
FIG. 3 is a cross sectional view of the rotor mounting for the generator of FIG. 2.
Figure 4:
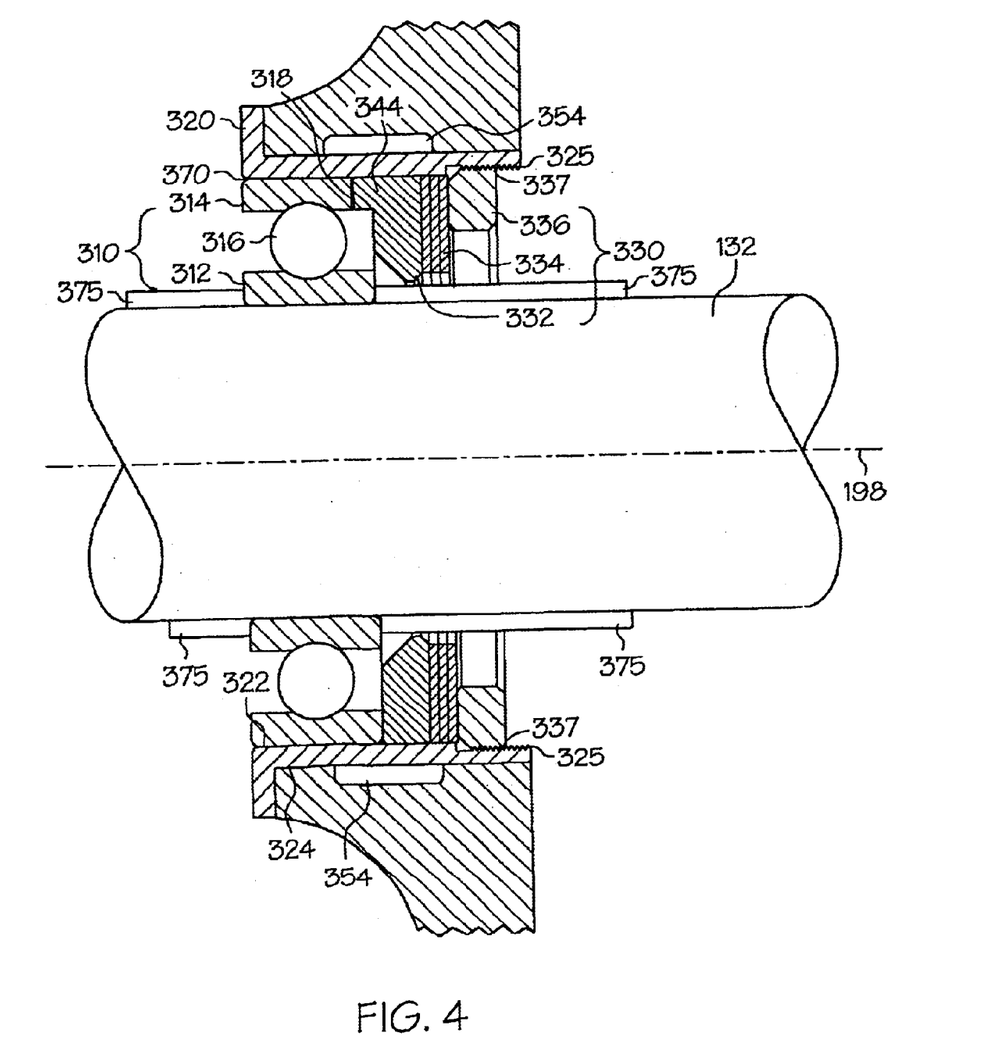
FIG. 4 is another cross sectional view of the rotor mounting system of FIG. 2.

As noted above, portions of the main generator 130 rotate about the axis 198. In particular, the main generator rotor shaft 132 is rotationally mounted within the generator system 100 using a plurality of mounting systems. Turning now to FIGS. 3–6, a mounting system for rotationally mounting the generator rotor shaft 132 is shown. Referring first to FIGS. 3 and 4, which depict two different cross sectional views of an embodiment of a generator mounting system 300, the mounting system 300 includes a bearing assembly 310, a bearing liner 320, a bearing load assembly 330, and a stationary support housing 350. The bearing assembly 310 is concentrically mounted on the rotor 132, and includes an inner race 312, and outer race 314, and ball bearings 316 that are sandwiched between, and are in rolling contact with, the inner 312 and outer 314 races. Thus, the inner 312 and outer 314 races rotate relative to one another.

The bearing liner 320 includes an inner circumferential surface 322, an outer circumferential surface 324, and at least one opening 326 that extends between the inner 322 and outer circumferential surfaces 324. The bearing assembly 310 is housed within the bearing liner 320, and is held in place. Specifically, the outer race 314 is held by an anti-rotation pin and an axial stop on one side and an axial preload through the bearing load assembly 330 on the other side. The inner race 312 is press fit onto the shaft. The inner race 312 is also locked by cylindrical spacers 375 on each side. The bearing assembly 310 and bearing liner 320 are dimensioned such that a small gap 370 is formed between the bearing assembly outer race 314 and the bearing liner inner circumferential surface 322. The gap 370 is located concentrically between the bearing outer race 314 and the bearing liner 320. The gap 370 is held to tolerances of +/−0.0002 inches. The gap 370 helps to control the bearing support damping force, radial spring rate and oil film stiffness. As will be described more fully below, oil is fed into the gap 370, via the openings 326, to hydraulically mount the bearing assembly 310 within the bearing liner 320. It will be appreciated that the size and number of the openings 326 in the bearing liner 320 may vary, but in a preferred embodiment three openings 326, evenly spaced around the bearing liner 320, each having a diameter of approximately 0.030 inches, are provided. It will further be appreciated that the size of the gap 370 may vary between 0.0025–0.0075 inches, but in a preferred embodiment it is approximately 0.003 inches.

To establish the preferred gap size for a particular generator, a parametric stability formula:

$$\text{Radius} \times (\text{Mount Length}/\text{Mount gap})^3$$

is used along with additional equations derived from desired bearing parameters to calculate a trial gap size. The radius in the parametric stability formula refers to the radius measured from the center of the shaft to the outer circumferential surface of the bearing outer race. The additional equations may be found in Gunter, et al., "Design of Nonlinear Squeeze-Film Dampers for Aircraft Engines," Journal of Lubrication Tech., January 1977, pp. 57–64. Further calculations using rotor dynamic and bearing sizing iterations and tests are then used to adjust and finalize the desired gap size.

The bearing load assembly 330 is mounted radially inward from the bearing liner 320 and includes a load plate 332, one or more belleville-type springs 334, and a load nut 336. The load plate 332 is located adjacent to the bearing assembly 310 and creates a substantially leak-resistant seal with the inner circumferential surface 322 of the bearing liner 320. Radial grooves 371 may also be included on the load plate 332. Thus, the load plate 332 provides a seal to keep the oil that is fed into the gap 370 within the bearing assembly 310. The belleville springs 334 and load nut 336 are used to press and hold the load plate 332 against the bearing assembly 310. More particularly, the load nut 336 includes threads 337 on at least a portion of its outer circumferential surface and a plurality of slots 339 on its inner circumferential surface (see FIG. 6). The bearing liner 320 includes threads 325 on a portion of its inner circumferential surface 322 that engage the threads 337 on the load nut 336. Thus, once the load plate 332 and belleville springs 334 are inserted within the bearing liner 320, the load nut 336 is threaded into the bearing liner 320 and is tightened using a tool that engages one or more of the slots 339. It should be appreciated that other type springs may be used instead of belleville springs 334.

The bearing load assembly 330 also substantially inhibits relative rotation (e.g., "anti-rotates") between the bearing assembly outer race 314 and the bearing liner 320. To do so, the load plate 332, as shown more clearly in FIG. 6, includes a notch 342 and a protrusion 344 formed on its outer circumferential surface 338. In addition, the bearing assembly outer race 314 includes a slot 318, and the bearing liner 320 includes a cavity 328. Thus, as shown more particularly in FIGS. 3 and 4, to anti-rotate the bearing assembly outer race 314, the protrusion 344 in the load plate 332 engages the slot 318 in the bearing assembly outer race 314, and a pin 450, that is inserted into the cavity 328, engages the notch 342 formed in the load plate 332.

Figure 5:
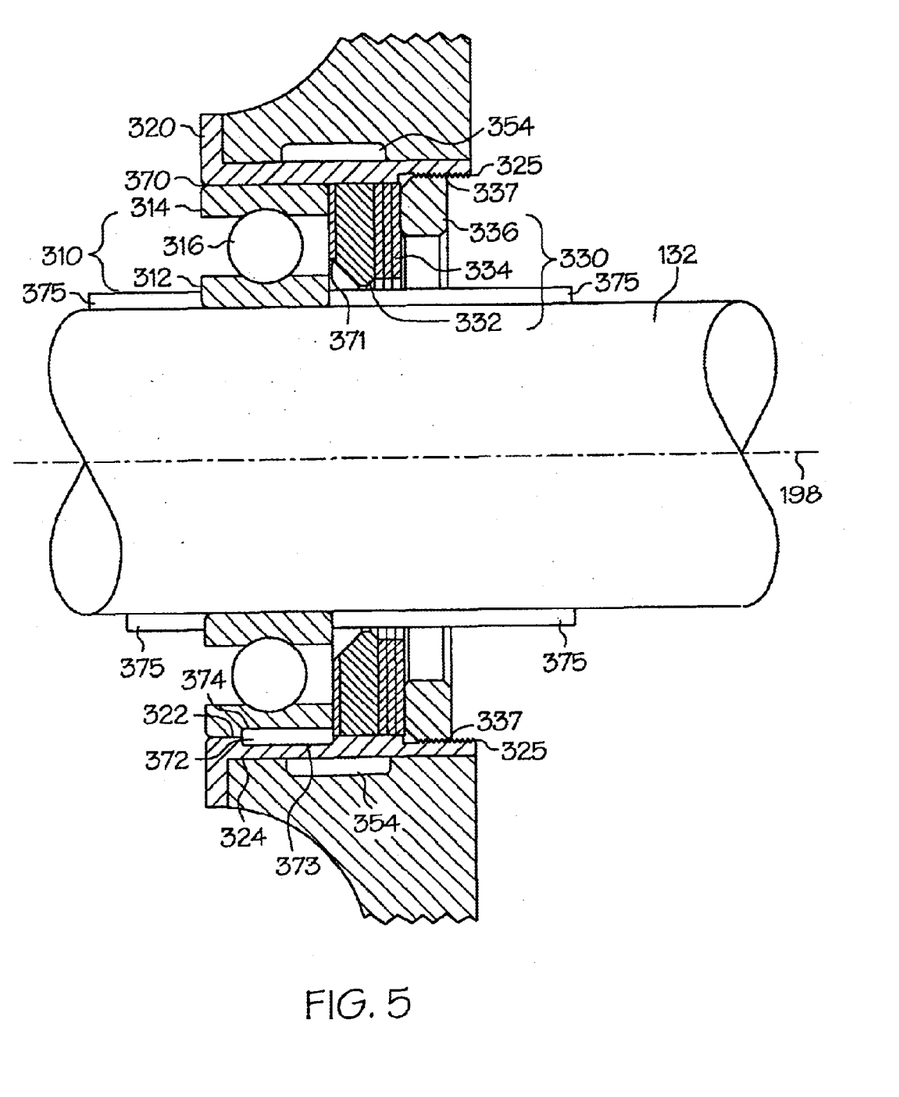
FIG. 5 is another cross sectional view of the rotor mounting system for the generator of FIG. 2.
Figure 6:
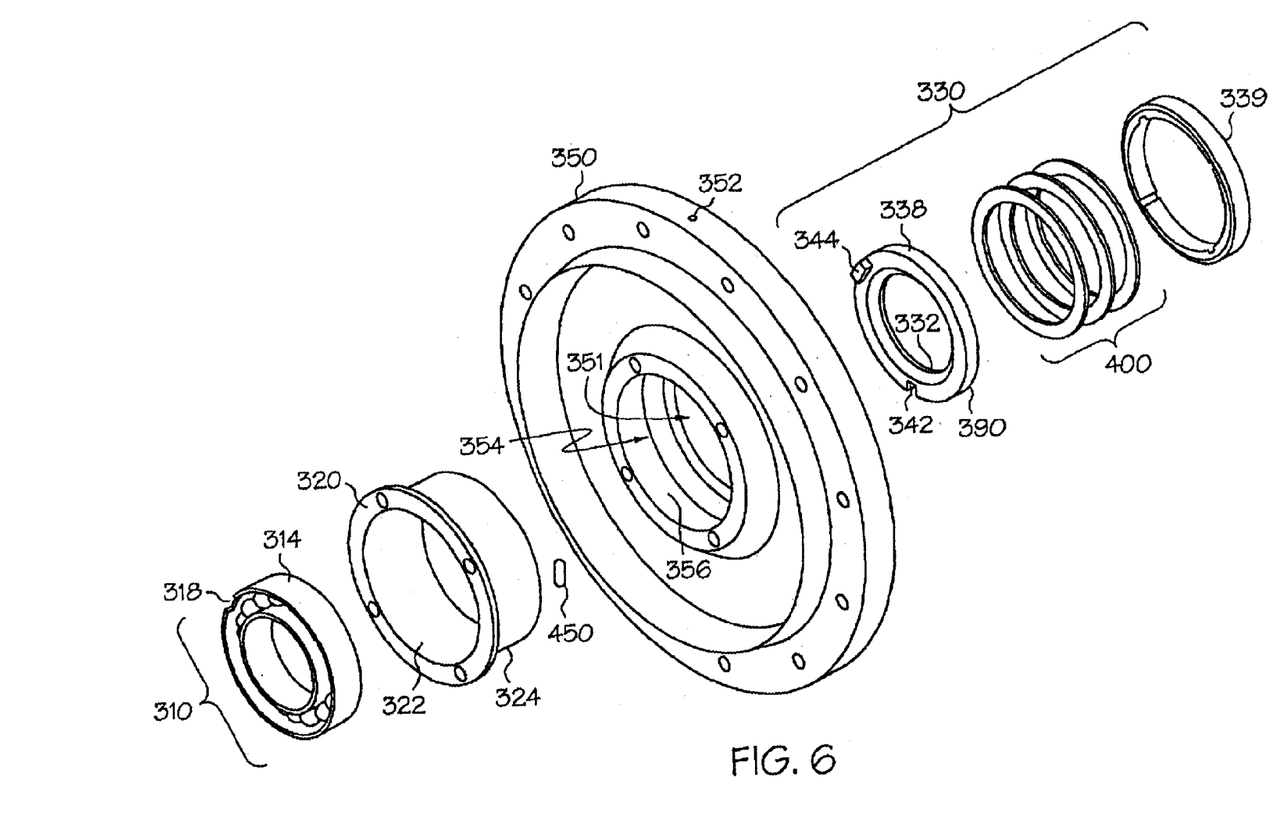
FIG. 6 is an exploded, perspective view of the rotor mounting system depicted in FIGS. 3 and 4.

As shown more clearly in FIG. 5, an alternate method of bearing outer race anti-rotation is shown. A pin 372 is inserted into an axial groove 374 located in the outer race 314 and into a groove 373 in the bearing liner 320.

The bearing liner 320 is interference fit into an opening 351 formed in the stationary support housing 350, which includes at least one oil inlet passage 352 and an annulus 354 that is formed on its inner circumferential surface 356. As shown most clearly in FIGS. 3 and 4, the oil inlet passage 352 is in fluid communication with each of the openings 326 in the bearing liner 320. When the generator system 100 is operating, oil from a pressurized oil source is fed into the generator housing 202 and directed toward the oil inlet passage 352. Pressurized oil source devices are known in the art and any type may be used. It should be appreciated that the supply pressure of the oil may be varied, but in a preferred embodiment the oil is supplied at a pressure of approximately 65 psi (pounds per square inch). The oil flows through the passage 352 and into the openings 326. The oil is then directed through the openings 326 into the gap 370 between the bearing outer race 314 and the bearing liner inner circumferential surface 322, thereby hydraulically mounting the bearing assembly in the bearing liner 320. As indicated above, the load plate 332 ensures that a substantial amount of the oil flows into the gap 370. Radial grooves 371, if cut in the bearing side of the load plate 332, can soften the mount and thus lower bearing load.

Although FIGS. 3–6 depict only a single oil inlet passage 352, it will be appreciated that other numbers of passages may be provided. It will be additionally appreciated that the size of the oil inlet passage 352 may be varied to meet particular system requirements. Preferably, the size and number of oil inlet passages 352 is such that the flow of oil through the oil inlet passages 352, at 65 psi, is approximately 0.2 gpm (gallons per minute).

The mounting system 300 not only dampens the rotor's vibrations at its critical speeds but, as alluded to above, also provides for limited control of the critical speeds. The critical speeds can be controlled by varying the size of the gap 370 between the bearing outer race 314 and the bearing liner inner circumferential surface 322, by controlling the flow rate of oil through the mounting system 300, by radial grooves 371 cut in the bearing side of the load plate 332 and by controlling the oil supply pressure to the mounting system 300.

The hydraulic mounting system 300 lowers the critical speeds well below the operating speeds of the generator rotor 132 and dampens rotor vibrations at the critical speeds. The oil that is fed into the gap 370 between the bearing outer race 314 and the bearing liner inner circumferential surface 322 provides a soft bearing support, viscous damping, and critical speed controllability.

While the invention has been described with reference to preferred embodiments, it will be understood by those skilled in the art that various changes may be made and equivalents may be substituted for elements thereof without departing from the scope of the invention. In addition, many modifications may be made to adapt the teachings of the invention herein to a particular situation without departing from the essential scope thereof. Therefore, it is intended that the invention not be limited to the particular embodiments disclosed as the best mode contemplated for carrying out this invention, but that the invention will include all embodiments falling within the scope of the appended claims.

We claim:

1. A mounting system for hydraulically mounting a high speed generator shaft, comprising:

a bearing assembly having a bearing inner race, a bearing outer race and bearings therebetween, the bearing inner race concentrically mounted on the shaft;

a cylindrical bearing liner mounted around the bearing assembly and configured to substantially inhibit relative rotation therebetween, the bearing liner having an inner circumferential surface and an outer circumferential surface and dimensioned to form a gap between the bearing outer race and the bearing liner inner circumferential surface; and at least one inlet oil port formed in the bearing liner and extending between the bearing liner inner circumferential surface and the bearing liner outer circumferential surface, whereby oil from a pressurized oil source is fed into the gap.

2. The mounting system in claim 1, further comprising:

a bearing load assembly mounted within the bearing liner longitudinally adjacent to the bearing assembly.

3. The mounting system of claim 2, wherein the bearing load assembly comprises:

a load plate positioned adjacent to the bearing assembly;

one or more belleville springs positioned adjacent the load plate; and a load nut positioned adjacent the belleville springs.

4. The mounting system of claim 3, further comprising:

a first cavity extending between the bearing liner inner circumferential surface and the bearing liner outer circumferential surface;

a notch formed on an outer surface of the load plate; and a pin having at least a first end inserted within the cavity and at least a second end inserted within the notch.

5. The mounting system of claim 4, further comprising:

a slot formed in the bearing assembly outer race; and a protrusion formed on the loading assembly outer surface and inserted within the slot.

6. The mounting system of claim 3, further comprising:

a first groove formed on the outer race;

a second groove formed on the bearing liner; and a pin having at least a first end inserted within the first groove and at least a second end inserted within the second groove.

7. The mounting system of claim 3, further comprising:

a first set of threads formed on at least a portion of the bearing liner inner circumferential surface; and a second set of threads formed on at least a portion of an outer surface of the load nut, the second set of threads engaging the first set of threads.

8. The mounting system of claim 3, further comprising:

a radial groove formed on the load plate adjacent to the bearing assembly.

9. The mounting system of claim 1, further comprising:

a stationary support housing surrounding at least a portion of the bearing liner outer circumferential surface, the support housing having at least one oil inlet passage in fluid communication with each bearing liner inlet port.

10. The mounting system of claim 1, wherein:

the gap is sized between 0.0025–0.0075 inches.

11. A mounting system for a high speed generator shaft, comprising:

a bearing assembly having a bearing inner race, a bearing outer race and bearings therebetween, the bearing inner race concentrically mounted on the shaft, the bearing outer race having a first slot formed therein;

a cylindrical bearing liner mounted around the bearing assembly, the bearing liner having an inner circumferential surface and an outer circumferential surface and dimensioned to form a gap between the bearing outer race and the bearing liner inner circumferential surface;

at least one inlet oil port formed in the bearing liner and extending between the bearing liner inner circumferential surface and the bearing liner outer circumferential surface, whereby oil from a pressurized source is fed into the gap;

a first cavity extending between the bearing liner inner circumferential surface and the bearing liner outer circumferential surface;

a load assembly mounted within the bearing liner and positioned longitudinally adjacent to the bearing assembly, the load assembly having a notch formed on an outer surface thereof; and a pin having at least a first end inserted within the cavity and at least a second end inserted within the notch.

12. The mounting system of claim 11, further comprising:

a slot formed in the bearing assembly outer race; and a protrusion formed on the loading assembly outer surface and inserted within the slot.

13. The mounting system of claim 12, wherein the bearing load assembly comprises:

a load plate positioned adjacent to the bearing assembly, the load plate having the notch and protrusion formed on an outer surface thereof;

one or more belleville springs positioned adjacent the load plate; and a load nut positioned adjacent the belleville springs.

14. The mounting system of claim 13, further comprising:

a radial groove formed on the load plate adjacent to the bearing assembly.

15. The mounting system of claim 13, further comprising:

a first set of threads formed on at least a portion of the bearing liner inner circumferential surface; and a second set of threads formed on at least a portion of an outer surface of the load nut, the second set of threads engaging the first set of threads.

16. The mounting system of claim 11, further comprising:

a stationary support housing surrounding at least a portion of the bearing liner outer circumferential surface, the support housing having at least one oil inlet passage in fluid communication with each bearing liner inlet port.

17. The mounting system of claim 11, wherein:

the gap is sized between 0.0025–0.0075 inches.

18. A high speed generator, comprising:

a housing;

a stator assembly mounted within the housing;

a rotor located within at least a portion of the stator assembly, the rotor having a shaft for rotation of the rotor about an axis; and wherein the rotor shaft is mounted using at least one hydraulic mount assembly that includes:

a bearing assembly having a bearing inner race and a bearing outer race, the bearing inner race concentrically mounted on the rotor shaft, a cylindrical bearing liner mounted around the bearing assembly and configured to substantially inhibit relative rotation therebetween, the bearing liner having an inner circumferential surface and an outer circumferential surface and dimensioned to form a gap between the bearing outer race and the bearing liner inner circumferential surface; and at least one inlet oil port formed in the bearing liner and extending between the bearing liner inner circumferential surface and the bearing liner outer circumferential surface, whereby oil from a pressurized oil source is fed into the gap.

19. The high speed generator in claim 18, further comprising:

a bearing load assembly mounted within the bearing liner adjacent the bearing assembly.

20. The high speed generator of claim 19, wherein the bearing load assembly comprises:

a load plate positioned adjacent to the bearing assembly;

one or more belleville springs positioned adjacent the load plate; and a load nut positioned adjacent the belleville springs.

21. The high speed generator of claim 20, further comprising:

a first cavity extending between the bearing liner inner circumferential surface and the bearing liner outer circumferential surface;

a notch formed on an outer surface of the load plate; and a pin having at least a first end inserted within the cavity and at least a second end inserted within the notch.

22. The high speed generator of claim 21, further comprising:

a first set of threads formed on at least a portion of the bearing liner inner circumferential surface; and a second set of threads formed on at least a portion of an outer surface of the load nut, the second set of threads engaging the first set of threads.

23. The high speed generator of claim 21, further comprising:

a stationary support housing surrounding at least a portion of the bearing liner outer circumferential surface, the support housing having at least one oil inlet passage in fluid communication with each bearing liner inlet port.

24. The high speed generator of claim 20, further comprising:

a radial groove formed on the load plate adjacent to the bearing assembly.

25. The high speed generator of claim 20, further comprising:

a first groove formed on the outer race;

a second groove formed on the bearing liner; and a pin having at least a first end inserted within the first groove and at least a second end inserted within the second groove.

26. The high speed generator of claim 25, further comprising:

a slot formed in the bearing assembly outer race; and a protrusion formed on the loading assembly outer surface and inserted within the slot.

27. The high speed generator of claim 18, wherein:

the gap is sized between 0.0025–0.0075 inches.

* * * * *